United States Patent Office 3,507,953
Patented Apr. 21, 1970

3,507,953
PESTICIDAL DITHIOPHOSPHONIC ACID ESTERS
Gerhard Schrader, Wuppertal-Cronenberg, Germany, assignor to Farbenfabriken Bayer Aktiengesellschaft, Leverkusen, Germany, a corporation of Germany
No Drawing. Filed Mar. 25, 1960, Ser. No. 17,500
Claims priority, application Germany, Mar. 28, 1959, F 28,059
Int. Cl. A01n 9/36; C07f 9/40
U.S. Cl. 424—205                             18 Claims The present invention relates to and has as its objects new and useful insecticidal derivatives of dithiophosphonic acids and processes for their production. Generally the new compounds of the present invention may be shown by the following formula:

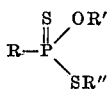

wherein R and R' stand for lower alkyl radicals, and R" stands for alkyl radicals substituted by halogen atoms, cyano groups, organic or inorganic acyl groups or optionally substituted aryl groups. The aforesaid substituents may also be linked to the alkyl group R" via hetero atoms.

A great number of dithiophosphonic acid esters are known already as pest control agents, part of them being important for practical purposes. For example, alkylmercapto-alkyl esters of thio- or dithiophosphonic acids are described in U.S. Patent No. 2,881,201.

The new group of derivatives of dithiophosphonic acid, which are also distinguished by an outstanding and partially systemic insecticidal activity, is obtainable according to this invention in a manner known in principle, i.e./e.g. by reacting the corresponding salts of O-alkyl-dithiophosphonic acids with correspondingly substituted alkyl halides. However, it is also possible to prepare the compounds obtainable according to the invention by reacting the corresponding O-alkyl-thiophosphonic acid halides, with correspondingly substituted alkyl mercaptans.

More particularly the compounds of the present invention are those compounds of the above formula:

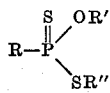

in which R stands for lower aliphatic or cyclo-aliphatic radicals up to 6 carbon atoms, R' more specifically should be a lower alkyl radical up to 4 carbon atoms and R" may be a lower alkyl radical up to 4 carbon atoms, possibly interrupted by hetero-atoms such as oxygen, sulfur or nitrogen and furthermore substituted by halogen atoms such as chlorine and bromine, the cyano group, aryl radicals, especially phenyl radicals, possibly substituted by e.g. halogen atoms, lower alkyl- or aryl-, especially phenyl-carbonyl groups, wherein the phenyl radicals also may bear substituents such as lower alkyl radicals or halogen atoms. R" also may be substituted by another

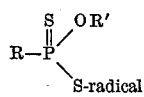

wherein R and R' have the same significance as said above.

The new compounds are excellent pest control agents and are intended to mainly be used for the protection of plants. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the present invention the compounds of the following formulae:

(I) 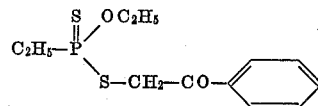

(II) 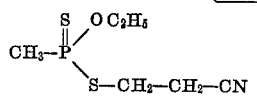

have been tested against aphids and spider mites. Aqueous solutions of the aforementioned compounds have been prepared by admixing them with the same amount of an auxiliary solvent (acetone). A commercial emulsifier (benzyl hydroxy dipehnyl polyglycol ether) is added in an amount of 20% referred to active ingredient. This mixture then is diluted with water to the desired concentration The tests have been carried out as follows:

(a) against aphids (species *Doralis fabae*): Heavily infested bean plants (*Vitia faba*) have been sprayed drip wet with solutions as prepared above in a concentration as shown below. The effect has been determined by evaluation after 24 hours by counting the dead pests either on the surface of the soil or still remaining on the plants. The following results have been obtained:

| Compound aqueous concentration (in percent active ingredient/water): | Killing rate (in percent) |
|---|---|
| (I) 0.1 | 100 |
| (II) 0.01 | 100 |

(b) against spider mites (contact-insecticidal action): Bean plants (*Phaseolus vulgaris*) of about 15 inches height are sprayed drip wet with solutions as prepared above in a concentration as shown below. The bean plants have been infested heavily with the two-spotted spider (species *Tetranychus telarius*). Evaluation has been carried out after 24 hours, 48 hours and 8 days. The following results have been obtained:

| Compound aqueous concentration (in percent active ingredient/water): | Killing rate (in percent) |
|---|---|
| (I) 0.1 | 100 |
| (II) 0.001 | 100 |

The following examples are given for the purpose of illustrating the process according to the present invention:

EXAMPLE 1

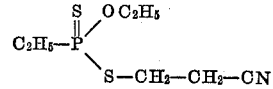

52 grams (0.25 mol) of ethyl-thionophosphonic acid-O-ethyl ester thiolic acid potassium salt are dissolved in 150 cc. of acetonitrile. 23 grams (0.25 mol) of β-chloropropionic acid nitrile are added at 80° C. with stirring. The temperature is kept at 80° C. for a further 5 hours and the reaction product is subsequently poured into 300 cc. of ice-water. The separated oil is taken up in 200 cc. of benzene washed neutral with water and dried with sodium sulfate. Upon fractionation, 40 grams of the new ester of B.P. 94° C./0.01 mm. Hg are obtained. Yield 72% of the theoretical. The ester is a colorless, water-insoluble oil having a mean toxicity of 2.5 mg./kg. on rats per os. Aphids are killed completely with 0.001% solutions, spider mites are killed to 50% with 0.001% solutions, caterpillars are killed completely with 0.1% solutions. Systemic action 0.1%=100%.

By the same way there may be obtained the following compound:

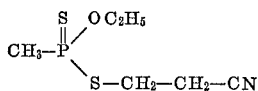

There are obtained 25 grams of the new ester of B.P. 90° C./0.01 mm. Hg. Yield 48% of the theoretical. Toxicity on rats per os $LD_{50}$ 2.5 mg./kg. Aphids are killed completely with solutions of 0.01% and solutions of 0.001% kill spider mites completely.

EXAMPLE 2

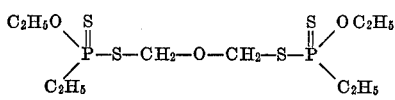

84 grams (⅔ mol) of ethyl-thionophosphonic acid-O-ethyl ester thiolphosphonic acid potassium salt are dissolved in 200 cc. of acetonitrile. 23 grams (⅓ mol) of α,α'-dichloro-dimethyl ether are added at 60° C. with stirring. The temperature is kept at 60° C. for a further hour and the reaction product is subsequently poured into 300 cc. of ice-water. The separated oil is taken up in benzene, washed neutral with water and dried. After evaporation of the benzene, 58 grams of the new ester are obtained as a colorless, water-insoluble oil which cannot be distilled even in a high vacuum. Yield 76% of the theoretical. On rats per os the new ester shows a mean toxicity of 2 mg./kg. Spider mites are killed completely with 0.001% solutions and caterpillars are killed completely with 0.1% solutions. The ester shows an ovicidal action. Systemic action 0.1%=100%.

EXAMPLE 3

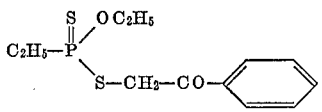

52 grams (0.25 mol) of ethyl-thionophosphonic acid-O-ethyl ester thiolic acid potassium salt are dissolved in 100 cc. of acetonitrile. 39 grams of ω-chloro-acetophenone dissolved in 50 cc. of acetonitrile, are added at 40° C. with stirring. The temperature is kept at 40° C. for a further hour and the product is then worked up as described in Example 2. 66 grams of the new ester are thus obtained in the form of a pale yellow, water-insoluble oil which is not distillable even in a high vacuum. Yield 92% of the thoretical.

On rats per os the new ester shows a toxicity on rats per os $LD_{50}$ 25 mg./kg. Aphids and spider mites are killed completely with 0.1% solutions. Systemic action 0.1%=100%.

By the same way, but using instead of ω-chloro-acetophenone the corresponding equimolecular amount of ω-chloro-p-bromo-aceto-phenone there is obtained the following compound

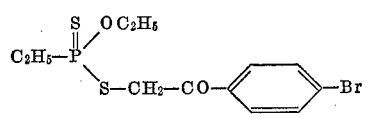

If ω-chloro-p-nitro-acetophenone is used there is obtained the compound of the following formula:

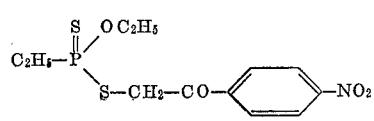

In a similar manner the following compound may be obtained:

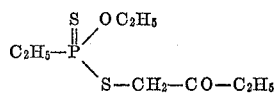

Also the following compounds are obtained in a strictly similar manner:

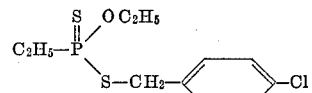

B.P. 112° C./0.01 mm. Hg. Yield 58 grams=79% of the theoretical. Toxicity on hats per os $LD_{50}$ mg./kg.

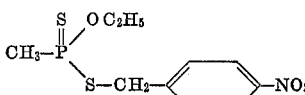

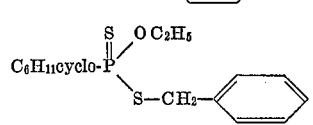

EXAMPLE 4

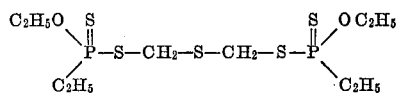

83 grams of ethyl-thiono-O-ethyl ester thiolic acid potassium salt (0.5 mol) are dissolved in 100 cc. of acetonitrile. 26 grams (0.25 mol) of α,α'-dichloro-dimethyl-sulfide are added at 80° C. with stirring. The temperature is kept at 80° C. for one hour and the reaction product is then poured into 300 cc. of ice-water. The separated oil is taken up in 200 cc. of benzene, washed neutral with water and subsequently dried over sodium sulfate. After distilling off the solvent, 67 grams of the new ester are obtained as a pale yellow, water-insoluble oil.

*Analysis.*—Calculated for mol 398 (percent): S, 40.6; P, 15.6. Found (percent): S, 41.0; P, 15.3.

Aphids are killed completely with 0.01% solutions. Larvae are killed completely with 0.00001% solutions.

EXAMPLE 5

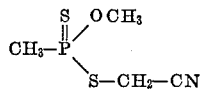

45 grams of the potassium salt of methyl-thiono-thiolphosphonic-O-methyl ester (0.25 mol) are dissolved in 150 ml. of aceto-nitrile. Thereafter there are added while stirring 19 grams of α-chloro-aceto-nitrile at 40° C. Heating and stirring is continued for 1 further hour, whereupon the reaction product is poured into 300 ml. of ice-water. An oil precipitates and is taken up in 200 ml. of benzene. The benzenic layer is washed neutrally with water and then dried under anhydrous sodium sulfate. After distilling off the solvent the new ester of the above formula is distilled in vacuum at 0.01 mm. at 75° C. The yield is 64% of the theoretical. Toxicity on rats per os $LD_{50}$ 10 mg./kg. Flies are killed to 90% with 0.0001% solutions, spider mites are killed completely with 0.01% solutions.

By the same way there may be obtained the following esters:

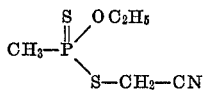

B.P. 86° C./0.01 mm. Hg. Yield: 33 grams of the new ester i.e. 68% of the theoretical. Toxicity on rats per os $LD_{50}$ 5 mg./kg. Larvae are killed completely with 0.000001% solutions, spider mites are killed completely with 0.1% solutions. The ester has an ovicidal action. Systemic action 0.1%=100%.

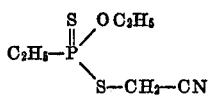

B.P. 92°/0.01 mm. Hg. Yield: 80% of the theoretical, i.e. 42 grams. Toxicity on rats per os $LD_{50}$ 2.5 mg./kg. Aphids are killed to 50% with 0.001% solutions. Flies are skilled completely with 0.0001% solutions.

I claim:

1. A dithiophosphonic acid ester of the following formula:

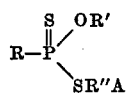

wherein R stands for a member selected from the group consisting of alkyl having up to 6 carbon atoms and cycloalkyl having up to 6 carbon atoms; R' stands for lower alkyl having up to 4 carbon atoms; R" stands for lower alkylene having up to 4 carbon atoms; and A is a member selected from the group consisting of cyano, phenylcarbonyl, lower alkyl phenyl-carbonyl, halophenyl-carbonyl, nitrophenyl-carbonyl-lower alkyl-carbonyl, phenyl, chlorophenyl, nitrophenyl,

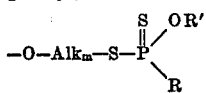

and

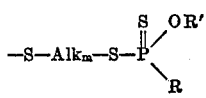

$Alk_m$ in each case being alkylene of at least 1 carbon atom, the total number of carbon atoms in $Alk_m$ and R" being 4.

2. A dithiophosphonic acid ester of the following formula:

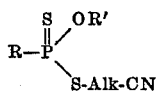

wherein R stands for alkyl having up to 6 carbon atoms, R' stands for alkyl having up to 4 carbon atoms, and Alk stands for lower alkylene having up to 4 carbon atoms.

3. A dithiophosphonic acid ester of the following formula:

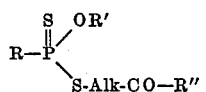

wherein R stands for alkyl having up to 6 carbon atoms, R' stands for lower alkyl having up to 4 carbon atoms and R" stands for phenyl.

4. A dithiophosphonic acid ester of the following formula:

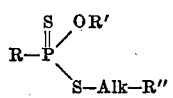

wherein R stands for alkyl having up to 6 carbon atoms, R' stands for alkyl having up to 4 carbon atoms and R" stands for lower alkyl.

5. A dithiophosphonic acid ester of the following formula

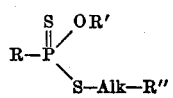

wherein R stands for alkyl having up to 6 carbon atoms, R' stands for alkyl having up to 4 carbon atoms and R" stands for phenyl.

6. A dithiophosphonic acid ester of the following formula:

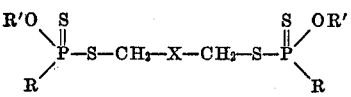

wherein R stands for alkyl having up to 6 carbon atoms, R' stands for alkyl having up to 4 carbon atoms and X stands for a member selected from the group consisting of oxygen and sulfur.

7. Cyanoalkyl phosphondithioates of the structure:

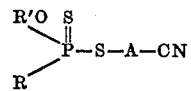

wherein R stands for lower alkyl containing 1 to 5 carbon atoms, R' stands for lower alkyl containing 1 to 4 carbon atoms and A stands for alkylene containing 1 to 4 carbon atoms.

8. The compound of the following compound:

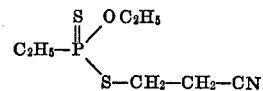

9. The compound of the following formula:

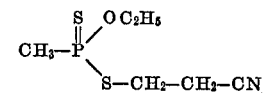

10. The compound of the following formula:

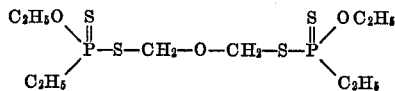

11. The compound of the following formula:

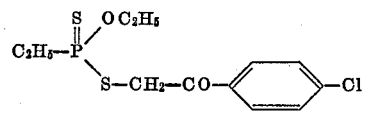

12. The compound of the following formula:

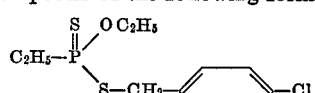

13. The compound of the following formula:

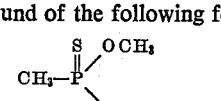

14. The compound of the following formula:

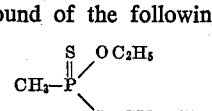

15. The compound of the following formula:

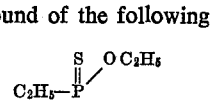

16. A bisorganophosphorus ester of the following formula:

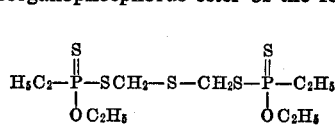

17. Bis-(O-ethyl ethylphosphonodithioyl)methyl ether.

18. A method of killing pests which comprises applying to a pest habitat a small but effective amount of a bisorganophosphorous ester of the following formula:

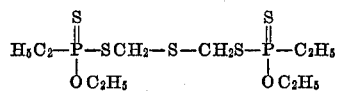

References Cited

UNITED STATES PATENTS

| | | | |
|---|---|---|---|
| 2,967,884 | 1/1961 | Dunn et al. | 260—461.110 |
| 3,013,047 | 12/1961 | Schrader | 260—461.110 |
| 2,494,283 | 1/1950 | Cassaday et al. | 260—461.112 |
| 2,494,284 | 1/1950 | Cassaday et al. | 260—461.112 |
| 2,611,728 | 9/1952 | Bartlett et al. | 260—461.112 |
| 2,862,017 | 11/1958 | Schrader | 260—461.112 |
| 2,881,201 | 4/1959 | Schrader | 260—461.112 |
| 2,884,353 | 4/1959 | Christman | 260—461.103 |
| 2,884,354 | 4/1959 | Christman | 260—461.103 |
| 2,908,605 | 10/1959 | Beriger | 260—461.112 |
| 3,100,735 | 8/1963 | Szabo et al. | 260—461.110 |

OTHER REFERENCES

Kabachnik Zhur. Obshchei Khim vol. 28, pp. 1568–1573 (1958).

CHARLES B. PARKER, Primary Examiner

R. L. RAYMOND, Assistant Examiner

U.S. Cl. X.R.

260—929, 940, 946, 954, 958, 961, 979; 424—210, 214, 218, 222